(12) United States Patent
Golfieri

(10) Patent No.: US 9,959,197 B2
(45) Date of Patent: May 1, 2018

(54) AUTOMATED BUG DETECTION WITH VIRTUAL MACHINE FORKING

(71) Applicant: VMware, Inc., Palo Alto, CA (US)

(72) Inventor: Marcello Golfieri, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 60 days.

(21) Appl. No.: 14/841,188

(22) Filed: Aug. 31, 2015

(65) Prior Publication Data

US 2017/0060732 A1    Mar. 2, 2017

(51) Int. Cl.
*G06F 11/36*    (2006.01)
*G06F 9/455*    (2006.01)

(52) U.S. Cl.
CPC ...... *G06F 11/3664* (2013.01); *G06F 11/3692* (2013.01); *G06F 2009/45591* (2013.01)

(58) Field of Classification Search
CPC ............. G06F 11/3664; G06F 11/3692; G06F 2009/45591
See application file for complete search history.

(56) References Cited

U.S. PATENT DOCUMENTS

| | | | | |
|---|---|---|---|---|
| 5,022,028 A | * | 6/1991 | Edmonds | G06F 11/3688 714/32 |
| 5,157,779 A | * | 10/1992 | Washburn | G06F 11/3414 714/37 |
| 5,335,342 A | * | 8/1994 | Pope | G06F 11/3672 714/38.13 |
| 5,371,883 A | * | 12/1994 | Gross | G06F 11/3688 714/38.1 |
| 5,758,062 A | * | 5/1998 | McMahon | G06F 11/3688 714/33 |
| 5,905,855 A | * | 5/1999 | Klaiber | G06F 11/3688 714/31 |

(Continued)

OTHER PUBLICATIONS

Narayanasamy et al., Software Profiling for Deterministic Replay Debugging of User Code, Proceedings of the 2006 conference on New Trends in Software Methodologies, Tools and Techniques: Proceedings of the fifth SoMeT_06, pp. 1-20.*

(Continued)

*Primary Examiner* — Tuan Q. Dam
*Assistant Examiner* — Zheng Wei
(74) *Attorney, Agent, or Firm* — Thomas Horstemeyer, LLP

(57) ABSTRACT

Techniques for automated bug detection. A set of inputs are collected and a snapshotting feature is used to apply each input to a test application. Outputs from the test application are gathered and compared to determine whether the outputs are associated with bugs. Comparison can be done with one or more of many different techniques that quantify difference between outputs associated with test inputs and outputs associated with a "happy path input." Outputs can be grouped together based on these quantifications and the groups can be used to identify outputs most likely to be associated with bugs. The output groups may also be used to group associated inputs to the set of inputs to be used for testing in the future. When a bug is identified, a report could be automatically generated that includes a scoring value as well as recorded output information and could be presented to a user.

20 Claims, 7 Drawing Sheets

(56) References Cited

U.S. PATENT DOCUMENTS

| | | | | |
|---|---|---|---|---|
| 6,360,332 | B1* | 3/2002 | Weinberg | G06F 11/3688 714/38.13 |
| 6,502,102 | B1* | 12/2002 | Haswell | G06F 11/3664 |
| 6,701,514 | B1* | 3/2004 | Haswell | G06F 11/3664 707/999.102 |
| 6,907,546 | B1* | 6/2005 | Haswell | G06F 11/3684 714/38.11 |
| 8,140,901 | B2* | 3/2012 | Kumar | G06F 11/2242 714/27 |
| 8,151,247 | B2* | 4/2012 | Wefers | G06F 11/3688 717/124 |
| 8,549,491 | B2* | 10/2013 | Chun | G06F 11/3664 703/13 |
| 8,990,774 | B2* | 3/2015 | Amintafreshi | G06F 11/3688 715/772 |
| 9,063,766 | B2* | 6/2015 | Chow | G06F 9/45533 |
| 9,111,030 | B1* | 8/2015 | Dunn | G06F 11/36 |
| 9,201,767 | B1* | 12/2015 | Tarlton | G06F 11/3672 |
| 9,215,245 | B1* | 12/2015 | Rajab | H04L 63/1433 |
| 9,229,845 | B1* | 1/2016 | Chandrasekharapuram | G06F 11/3672 |
| 9,251,435 | B2* | 2/2016 | Danko | G06K 9/6217 |
| 9,395,890 | B2* | 7/2016 | Kastrinogiannis | G06F 8/71 |
| 9,424,481 | B2* | 8/2016 | Danko | G06K 9/6217 |
| 2001/0028359 | A1* | 10/2001 | Muraishi | G06F 9/45512 715/700 |
| 2003/0009709 | A1* | 1/2003 | Belenger | G06F 11/3688 714/37 |
| 2003/0229825 | A1* | 12/2003 | Barry | G06F 11/3688 714/38.14 |
| 2006/0036589 | A1* | 2/2006 | Okuda | G06F 17/30595 |
| 2006/0156156 | A1* | 7/2006 | Elnozahy | G06F 11/3624 714/746 |
| 2006/0212540 | A1* | 9/2006 | Chon | G06F 11/261 709/218 |
| 2006/0271824 | A1* | 11/2006 | Kwong | G06F 11/3688 714/38.12 |
| 2006/0271830 | A1* | 11/2006 | Kwong | G06F 11/3688 714/50 |
| 2007/0050677 | A1* | 3/2007 | Klamik | G06F 11/3688 714/47.2 |
| 2008/0086660 | A1* | 4/2008 | Wefers | G06F 11/3688 714/37 |
| 2010/0095159 | A1* | 4/2010 | Jeong | G06F 11/3688 714/38.1 |
| 2010/0131928 | A1* | 5/2010 | Parthasarathy | G06F 11/3664 717/126 |
| 2010/0146487 | A1* | 6/2010 | Chun | G06F 11/3688 717/126 |
| 2011/0131452 | A1* | 6/2011 | Kumar | G06F 11/2242 714/34 |
| 2012/0011491 | A1* | 1/2012 | Eldar | G06F 11/3612 717/130 |
| 2012/0159448 | A1* | 6/2012 | Arcese | G06F 11/28 717/124 |
| 2012/0239987 | A1* | 9/2012 | Chow | G06F 9/45533 714/49 |
| 2012/0243745 | A1* | 9/2012 | Amintafreshi | G06F 11/3692 382/103 |
| 2013/0024940 | A1* | 1/2013 | Hutchins | G06F 9/45558 726/24 |
| 2013/0047140 | A1* | 2/2013 | Shann | G06F 11/3664 717/128 |
| 2013/0085720 | A1* | 4/2013 | Xie | G06F 9/455 703/1 |
| 2013/0238934 | A1* | 9/2013 | Kadowaki | G06F 11/2294 714/31 |
| 2014/0040897 | A1* | 2/2014 | Davis | G06F 11/362 718/100 |
| 2014/0215461 | A1* | 7/2014 | Laor | G06F 9/45533 718/1 |
| 2014/0237451 | A1* | 8/2014 | Koneru | G06F 11/3688 717/124 |
| 2014/0245070 | A1* | 8/2014 | Rumble | G06F 11/3692 714/38.14 |
| 2014/0304685 | A1* | 10/2014 | Xie | G06F 9/455 717/124 |
| 2014/0325486 | A1* | 10/2014 | Zhang | G06F 11/3692 717/125 |
| 2015/0089479 | A1* | 3/2015 | Chen | G06F 11/3664 717/124 |
| 2015/0205882 | A1* | 7/2015 | Vukas | G06F 17/30899 707/758 |
| 2015/0234736 | A1* | 8/2015 | Koju | G06F 11/3692 717/131 |
| 2015/0317244 | A1* | 11/2015 | Shann | G06F 11/3664 717/128 |
| 2015/0324260 | A1* | 11/2015 | Mutalik | G06F 9/45558 714/703 |
| 2016/0011893 | A1* | 1/2016 | Strong | G06F 9/45533 718/1 |
| 2016/0254982 | A1* | 9/2016 | Kuznetsov | H04L 41/04 709/224 |
| 2017/0060732 | A1* | 3/2017 | Golfieri | G06F 11/3664 |

OTHER PUBLICATIONS

Yuji Kukimoto, "The Donald O. Pederson Center for Electronic Systems Design" http://embedded.eecs.berkeley.edu/research/vis/doc/VisUser/vis_user/node4.html , Feb. 6, 1996, 5 pages.

E. M. Clarke et al., "Automatic Verification of Finite State Concurrent System Using Temporal Logic Specifications: A Practical Approach", Proceedings of the 10th ACM SIGACT-SIGPLAN Symposium on Principles of Programming Languages, p. 117-126 ACM, Austin, Texas, 1983.

J. B. MacQueen (1967): "Some Methods for classification and Analysis of Multivariate Observations, Proceedings of 5-th Berkeley Symposium on Mathematical Statistics and Probability", Berkeley, University of California Press, 1:281-297.

"What is JBF?", Java Pathfinder http://babelfish.arc.nasa.gov/trac/jpf/wiki/intro/what_is_jpf; Powered by Trac 1.0.1 </ trac/jpf/about> By Edgewall Software.

Klaus Havelund et al, "Model checking JAVA programs using JAVA PathFinder", International Journal on Software Tools for Technology Transfer, Sep. 11, 1999.

Cristian Cadar et al., "KLEE: Unassisted and Automatic Generation of High-Coverage Tests for Complex Systems Programs",8th USENIX Symposium on Operating Systems Design and Implementation, pp. 209-224.

Cristian Cadar et al, "EXE: Automatically Generating Inputs of Death", ACM Transactions on Information and System Security, vol. 12, No. 2, Article 10, Pub. date: Dec. 2008, pp. 10:1-10:38.

* cited by examiner

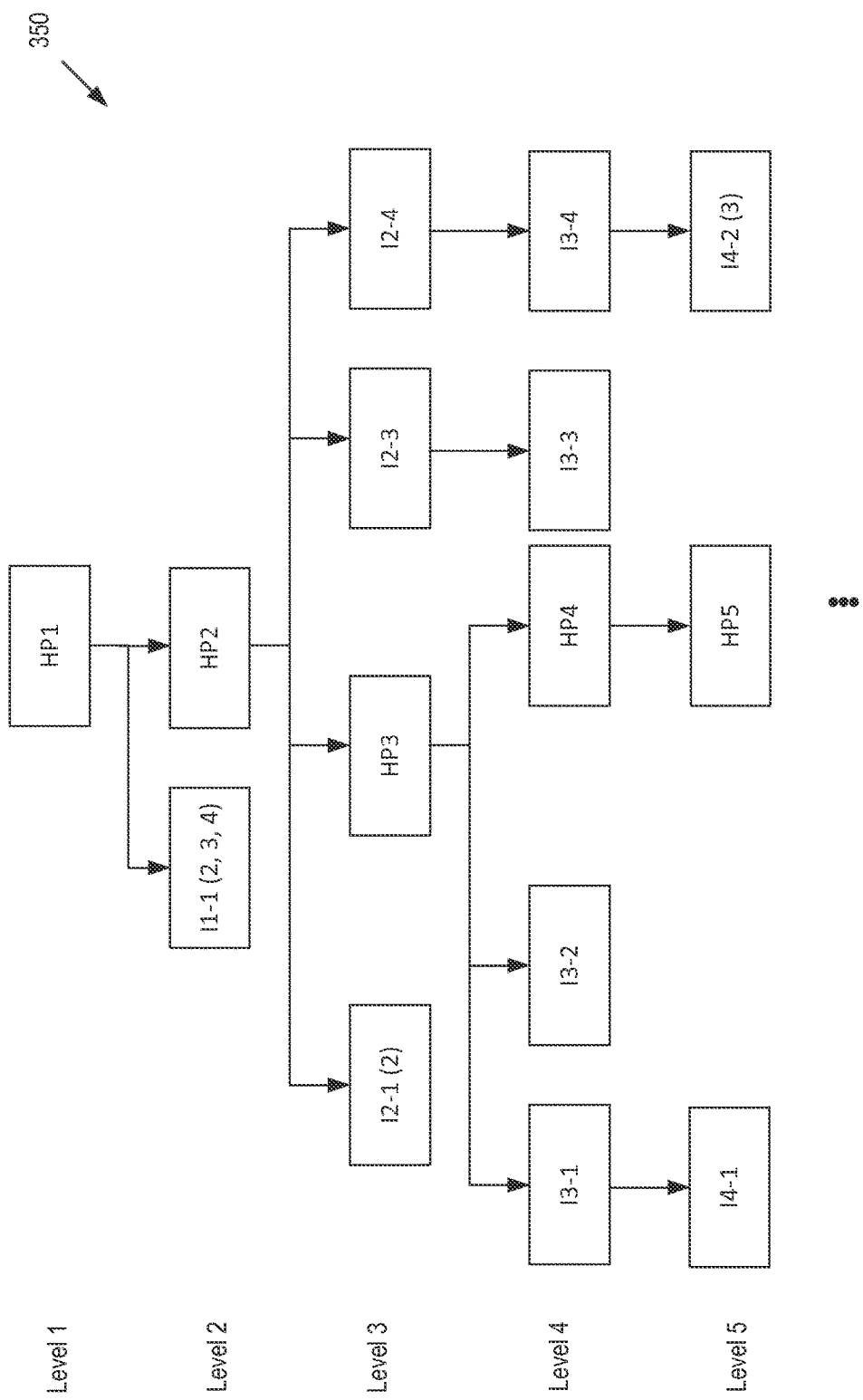

AUTOMATED BUG DETECTION WITH VIRTUAL MACHINE FORKING

BACKGROUND

The process of debugging software generally includes finding bugs, determining the cause of bugs, and fixing such bugs. For various reasons, finding certain bugs may be very difficult. One reason is that the number of possible inputs to an application may be extremely high. For example, even an application whose only inputs include a simple wizard with four input pages, each having four check boxes would have a number of possible input combinations that is quite high. Testing each of these inputs manually may be difficult and time consuming.

SUMMARY

A method is provided. The method includes executing a test application in a virtual machine. The method also includes forking the virtual machine at a first fork point to generate a first forked virtual machine. The method further includes applying a first test input to the first forked virtual machine. The method also includes responsive to applying the first test input, recording a first test output. The method further includes comparing the first test output to a first happy path output associated with a first happy path input to determine whether the first test input is associated with a bug.

A system is provided. The system includes a first computer system including a first processor and a first memory storing instructions that, when executed by the first processor, cause the first processor to execute one or more virtual machines. The system also includes a second computer system including a second processor and a second memory storing instructions that, when executed by the second processor, cause the second processor to execute a software bug analyzer. The software bug analyzer is configured to execute a test application in a virtual machine of the one or more virtual machines. The software bug analyzer is also configured to fork the virtual machine at a first fork point to generate a first forked virtual machine. The software bug analyzer is further configured to apply a first test input to the first forked virtual machine. The software bug analyzer is also configured to responsive to applying the first test input, record a first test output. The software bug analyzer is further configured to compare the first test output to a first happy path output associated with a first happy path input to determine whether the first test input is associated with a bug.

A non-transitory computer-readable medium storing instructions that, when executed by a processor, cause the processor to perform a method. The method includes executing a test application in a virtual machine. The method also includes forking the virtual machine at a first fork point to generate a first forked virtual machine. The method further includes applying a first test input to the first forked virtual machine. The method also includes responsive to applying the first test input, recording a first test output. The method further includes comparing the first test output to a first happy path output associated with a first happy path input to determine whether the first test input is associated with a bug.

BRIEF DESCRIPTION OF THE DRAWINGS

FIG. 3B is a program flow diagram that illustrates a subsequent test of test application using fewer inputs due to certain inputs being deemed to be similar, according to an example.

DETAILED DESCRIPTION

Figure 1:
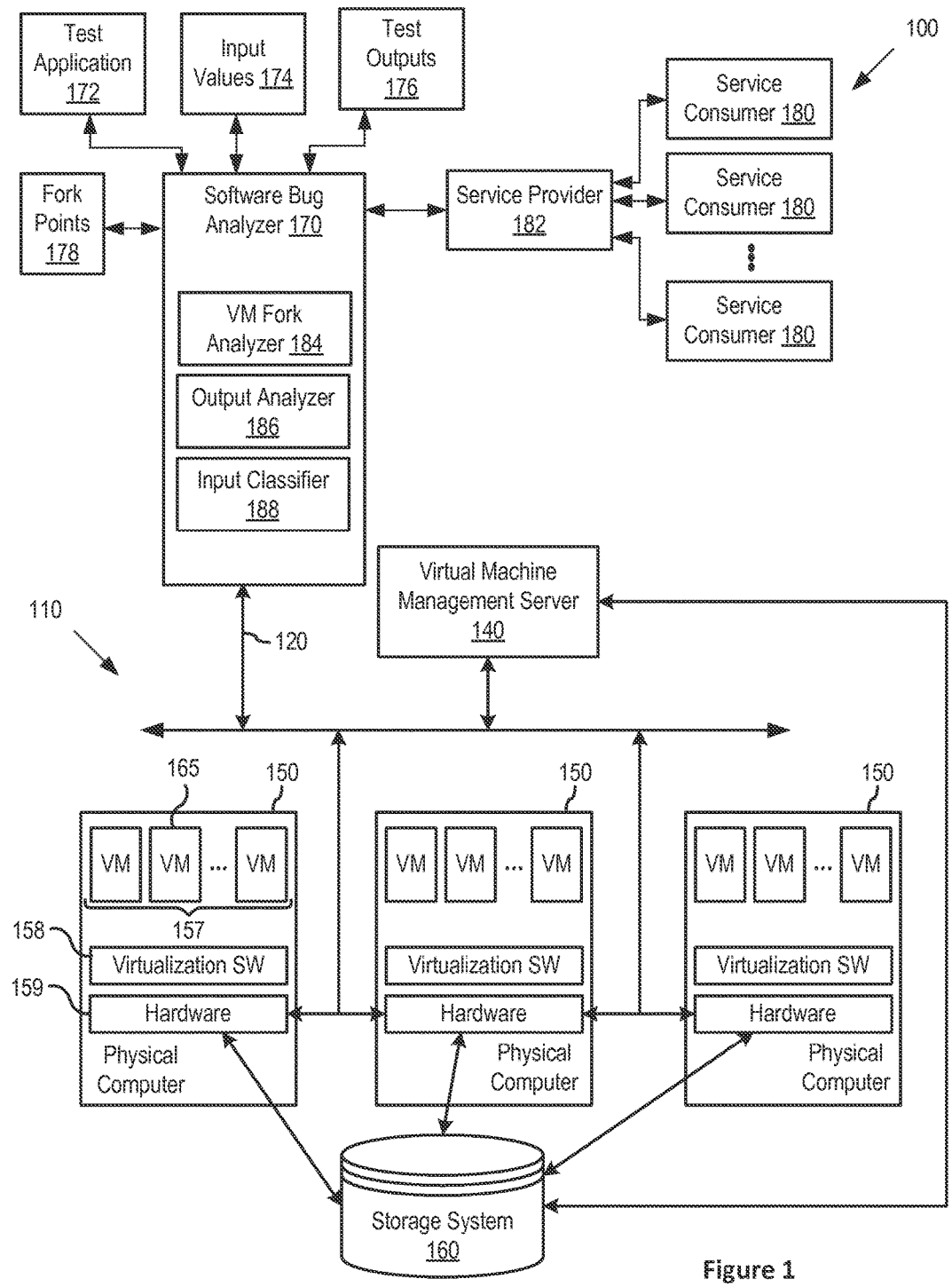
FIG. 1 illustrates components of an automated bug analysis system in which one or more examples of the present invention may be implemented.

FIG. 1 illustrates components of an automated bug analysis system 100 in which one or more examples of the present invention may be implemented. Automated bug analysis system 100 includes a computer system 110 and software bug analyzer 170. Software bug analyzer is coupled to a service provider 182, which is in turn coupled to one or more service consumers 180. Software bug analyzer 170 accepts and/or modifies various data, including a collection of fork points 178, a collection of test input values 174, and a collection of test outputs 176, as well as a test application 172. Each of these types of data and test application 172 may be stored at any location, including within storage in the computer system executing software bug analyzer 170, storage local to service provider 182, or any other storage within automated bug analysis system 100 that is accessible to software bug analyzer 170. Various components of automated bug analysis system 100 communicate via network 120. For simplicity, a single network is shown but it should be recognized that, in actual implementations, the components of automated bug analysis system 100 may be connected over the same network or different networks.

Software bug analyzer 170 tests test application 172 for bugs as described in further detail below. Test application 172 is any software application (or any piece of software that can be executed, such as system software, software modules, dynamic linked libraries, and the like) for which bug detection is desired.

Computer system 110 includes a plurality of physical computers 150 executing virtual machines 157 for performing the automated bug testing. More specifically, virtual machines 157 ("VMs") are executed on a plurality of physical computers 150, each of which includes virtualization software 158 and hardware 159. Virtual machines 157 are controlled by a virtual machine management server 140, and are coupled to a shared persistent storage system 160, which may persistently store data commonly used between virtual machines 157. Virtualization software 158 runs on hardware 159 of host systems 150 and "creates" virtual machines 157 for use by software bug analyzer 170 for performing bug analysis. More specifically, virtualization software 158 creates a virtualized version of a hardware computer by interfacing with hardware 159 and presenting to users of virtual machine 165 an interface that appears to be an actual computer.

Software bug analyzer 170 uses a virtual machine forking feature, coupled with efficient application input gathering and selection, as well as application output analysis, to identify states of test application 172 that are likely to be associated with bugs. The VM forking feature allows for state associated with a VM (and application executing in the VM) to be saved so that after a set of test inputs is applied to the application and output is recorded, the VM state prior to applying the candidate set of inputs can be restored for testing a new set of inputs. This action may be repeated with different inputs in order to record output for a range of test inputs. Software bug analyzer 170 executes test application 172 in one or more VMs 157 in order to use the VM forking feature to check test application 172 for bugs. Note that the virtual machine forking technique is one example of a snapshotting technique that may be used in accord with the present disclosure. A snapshotting technique allows state of a computing entity (such as a virtual machine) to be saved so that such state may be returned to at a later time. Any snapshotting technique may be used in place of the virtual machine forking technique described herein.

The length of time elapsed when using the VM forking feature to check test application 172 depends on the number of test inputs to be tested. Even for very simple applications, the total number of possible inputs may be quite high. Thus, it is generally advantageous to limit the number of inputs to be used. One way to limit the number of inputs to be applied is through crowdsourcing. Specifically, in some embodiments, software bug analyzer 170 gathers inputs to test application 172 via crowdsourcing. For example, software bug analyzer 170 may obtain software inputs from service consumers 180 (via service provider 182), which are computing systems that consume a service provided by service provider 182. In one example, service provider 182 is a computer system controlled by a developer of virtualization software for executing virtual machines. Such a service provider may provide services, such as cloud-based VM execution, cloud-based VM management, or other services, to which service consumers 180 subscribe. If and when a particular service consumer 180 executes test application 172, service provider 182 may obtain inputs provided by a user of the test application on the service consumer and forward those inputs to software bug analyzer 170. Software bug analyzer 170 then stores those inputs into input values 174 for later use during testing of test application 172.

Crowdsourcing inputs in this manner allows for the number of inputs used to be limited to those that are considered to be likely to be used and also considered to be important. More specifically, because the inputs have already been used during execution of the test application by service consumers 180 (and may have in fact triggered a bug on service consumer 180), it is somewhat likely that the same inputs will be used again in future executions of the test application.

Software bug analyzer 170 may gather inputs in ways other than via crowdsourcing. In one example, a developer or other user of test application 172 may directly provide example inputs to software bug analyzer 170. Alternatively or additionally, an input generator may algorithmically generate inputs. Inputs may be generated that are qualitatively different, where qualitatively different may refer to inputs that differ wholly in type. One example of qualitatively different inputs includes strings that differ in at least one or more characters used throughout the string, as opposed to strings that have the same characters that are rearranged.

Once inputs are obtained, software bug analyzer 170 performs the VM forking operations described above, traversing through test application 172 as defined by a set of fork points and by a set of "happy path inputs." The fork points define locations within the test application 172 at which different inputs are to be applied. The happy path inputs are input values that provide a "desired" or "error-free" test application execution. Happy path inputs may be pre-set or pre-defined for the test application 172, representing inputs for which it is known that the output is satisfactory. Happy path inputs thus would not be crowd-sourced.

Each time a fork point is reached, software bug analyzer 170 forks the VM, saving a state of the VM associated with the happy path and generating a new "forked" VM. For each input in input values 174 associated with that fork point, software bug analyzer 170 applies the input to test application 172 and records the output in test outputs 176. Test outputs may include various types of outputs including a screenshot of the user interface ("UI") state after inputs have been applied, a log file output (where the log file is a test application-generated file that includes messages generated for the purpose of recording status of the test application) after inputs have been applied, a core dump (which consists of the recorded contents of memory at the time the core dump is taken) or other types of outputs, some of which are described below. Note that specific fork points and points at which outputs are to be captured may be pre-defined. Note also that in forking VMs, it may be preferable for the VM forking feature to ensure that the "environment" in which the forked VM operates is "identical" to some degree. In other words, it may be preferable to fork the VM and to create an environment for the VM such that various "external" items appear as identical to the external items on the parent VM. Such external items may include what network the VM is connected to, various network related addresses, hardware seen by the VM, and so forth. The purpose of this is to ensure similar operation between the forked VM and the parent VM.

Once test outputs associated with the inputs are obtained, software bug analyzer 170 analyzes the test outputs to determine whether the outputs are associated with bugs. In general, this analysis is done by quantifying the difference between outputs generated for the test inputs and outputs associated with the happy path to generate "output differentials," and subsequently applying a bug detection technique to one or more output differentials to determine whether particular inputs are associated with bugs. Note that software bug analyzer 170 executes test application 172 with happy path inputs and records the resulting outputs as happy path outputs (either before performing the VM fork technique or at a different time). These outputs are obtained so that the difference between the happy path outputs and outputs associated with test inputs may be quantified, in order to determine whether any particular test input is associated with a bug.

There are many ways to quantify the difference between happy path outputs and test outputs. Several examples are now provided. If a screenshot capture is obtained as an output, a comparison of graphical data may be used to determine the difference. One way to characterize graphical data is a perceptual hash. In general, a perceptual hash accepts a graphical item as input, performs a series of simplifying operations on the graphical item, and outputs a hash value. One example of a perceptual hash algorithm is provided. First, an image is reduced in resolution to a fixed "reference" resolution (e.g., 8×8, 16×16, or the like). Next, the image is converted to grayscale. Next, the average brightness value is found for all pixels in the image. Next, each pixel is replaced with a single bit that represents whether that particular pixel has a brightness that is greater than or less than the average brightness. The resulting series of bits is included in a hexadecimal hash value that is representative of the original image. This perceptual hash is taken for happy path outputs, as well as for outputs associated with test inputs. A Hamming distance is calculated between the happy path output and the output associated with the test input, where the Hamming distance is equal to the number of hexadecimal symbols that differ between the two perceptual hashes. Note that although one specific technique for performing a perceptual hash is described, it should be understood that any perceptual hash technique that accepts an image and generates a shortened string representative of that image may be used.

Another technique for quantifying difference involves identifying the size of a log file differential. If test application 172 outputs a log file, then a differential between the log file associated with the happy path inputs and a particular test input can be obtained. This differential, called the "log file differential" herein, represents the characters that differ between the two log files. In one example, the log file for the test input has additional lines not included in the log file for the happy path inputs. In another example, in one line of the log file for the test inputs, several characters are different than the corresponding line of the log file for the happy path input. The characters that differ are included in the log file differential. The size of the log file differential may be used as a quantification of the difference between the output (log file) of the happy path and the output of the test inputs. A log file differential for two identical log files will of course be zero. Thus a zero-size log file differential may indicate identical or nearly identical execution. Note that in comparing log files, timestamps may be stripped out where they occur, as timestamps will generally be different.

Another technique for quantifying difference includes detecting whether a stack trace is output (e.g., to a file, a console, or the like) for the test inputs. As is generally known, a stack trace is output that presents information regarding the stack frames that are currently active, which may present information regarding what functions are currently being called and the like. Stack traces may be used for debugging purposes. A differential for a stack trace may be calculated as simply zero or a constant value depending on whether a stack trace exists. This is because typically, applications output stack traces only when an error occurs. Thus, if a stack trace occurs for a particular input, then the stack trace differential may be set to a constant value (such as 1, 5, or some other value) while if a stack trace does not occur for a particular input, then the stack trace differential may be set to zero. The constant value may be adjusted to ensure that the particular input is associated with an error, if desired.

Another technique for quantifying difference includes determining whether particular keywords exist in a log file for a particular test input. For example, a log file for the test input might include a keyword deemed to indicate a bug, such as "ERROR," "WARNING," or the like. As with stack trace differentials, keyword differentials may be set to 0 or a constant, selectable number (or "score") depending on whether a particular designated keyword is found in the log file. If additional keywords are found, the keyword differential can be increased by an amount smaller than the number for the first instance of the keyword for each additional keyword found.

Another technique for quantifying difference includes determining whether a core dump occurs. As is known, a core dump represents the contents of memory at a particular point in time. As with the stack trace and keyword metrics described above, a "core dump differential" may be set to a selectable constant value if a core dump is output (e.g., to a file or a console) and to a value of zero if no core dump is output. Each dump may be scored by various scoring algorithms configured specifically for evaluating core dumps.

Other techniques may of course be used to quantify differences between happy path outputs and outputs associated with test inputs. As with stack traces, quantifying differences between core dumps may include using tools to identify variables within the core dumps and identifying which variables are different. This may be seen as analogous to the Hamming distance described elsewhere herein.

Note that the list of differences described above is not an exhaustive list of differences and that various other types of differences may be used alternatively or additionally. With the difference between outputs for the happy path and test inputs quantified, software bug analyzer 170 can score the output quantifications to determine whether a bug is associated with any particular output. Scoring may be performed in any technically feasible manner. One approach for scoring is described herein. It should be understood, however, that other scoring approaches can be used, such as an approach that accepts a set of inputs (e.g., the differences between happy path outputs and test outputs), which can be trained to correlate the set of inputs to particular outcomes (e.g., whether a particular input is associated with a bug), and which can subsequently categorize inputs as belonging to the particular outcomes. Note that a higher score may indicate a higher likelihood of a bug.

An approach for scoring is now described. Various factors may affect the score for any particular output. These factors may be ranked according to degree of impact on the score. The first factor, with the highest degree of impact, is a user-driven override. This may be used to train the scoring functionality of the software bug analyzer 170, or simply to direct that a particular result is to be interpreted with a particular outcome. This user-driven override would simply override any other factor and direct that a specific output (or set of multiple outputs—e.g., log file differential of X and Hamming distance of Y) is interpreted as having a particular outcome (e.g., bug or no bug). The second factor, which is weaker than the first factor but stronger than the remaining factors, is a string driven classification scheme that searches for strings in the outputs (e.g., log files), and either classifies the associated input as being related to a bug or not being related to a bug based on a particular directive (e.g., if a particular string is found, then that is a bug; if a particular different string is found, then that is not a bug). The second factor overrides the third and fourth factors but the first factor overrides the second factor. The third factor is a grouping scheme that groups various input combinations based on the differential quantification described above and identifies each group as being associated with a bug or not being associated with a bug. The third factor is described in more detail below. The third factor is weaker than the second and first factors but stronger than the fourth factor. More specifically, if neither the first or second factor dictate a specific outcome for a specific set of input values, then the third factor controls. The fourth factor is identifying whether the inputs are similar to or different from other inputs that have previously been used before in testing. Similarity may be quantified via the techniques described above, such as via a Hamming distance, a length difference, a combination, or in other ways. This factor has the least impact on score. Specifically, if none of the first factor, the second factor, or the third factor dictate a particular outcome, then the fourth factor may be used to characterize output for a particular input. Note that any of the factors described above may or may not be used in scoring particular output. Note also that although some factors are described as "overriding" other factors, in some embodiments, a factor having a higher degree of impact may instead simply be given a stronger weight. For example, a number associated with the factor may be scaled (e.g., multiplicatively) or scaled in some other manner. Thus, for example, the second factor may be given a less weight than the first factor, but not necessarily be overridden by the first factor, and the third factor may be given a lesser weight than both the second factor and the first factor, but may not necessarily be overridden by the first factor.

As discussed above, input values can be grouped together for the purpose of scoring. The same groupings may also be used to reduce the number of inputs to be applied when subsequent testing of test application 172 is performed (e.g., when a new version of test application 172 is to be tested). More specifically, in an early round of testing, several test values may be applied to test application 172. Software bug analyzer 170 may determine that each of those test values belong in a single group. When software bug analyzer 170 performs subsequent testing, software bug analyzer 170 would apply only one of the inputs from that group. This reduction in inputs is possible because in grouping the inputs together, software bug analyzer 170 has determined that output behavior for all of those inputs is substantially similar and thus that testing each input in that group would be redundant.

Note that software bug analyzer 170 includes several subdivisions of functionality, including VM fork analyzer 184, statistical analyzer 186, input classifier 188 and output manager 189. These subdivisions represent functional subdivisions of software bug analyzer 170 and may be embodied as specific software or hardware subdivisions (e.g., modules, processes, programs, and the like) of the software bug analyzer 170 that may be executed on different computers or in the same computer. Note that although specific subdivisions are illustrated, each with accompanying functionality, other organizations of the functionality described herein are within the scope of this disclosure. Thus, any functionality of any specific subdivision of software bug analyzer 170 may alternatively be performed by a different subdivision of functionality. Thus, embodiments with fewer or no subdivisions of functionality, where the software bug analyzer 170 is a single unified component that performs some or all of the functions of the illustrated subdivisions are consistent with this disclosure.

The functionality of the components of software bug analyzer 170 is now briefly described. VM fork analyzer 184 obtains input values 174, applies the input values to test application 172, and performs forking operations as described herein to obtain outputs. Output analyzer 186 analyzes the outputs to generate output differentials as described herein. Input classifier 188 groups inputs together for simplification of future testing as described herein.

Figure 2:
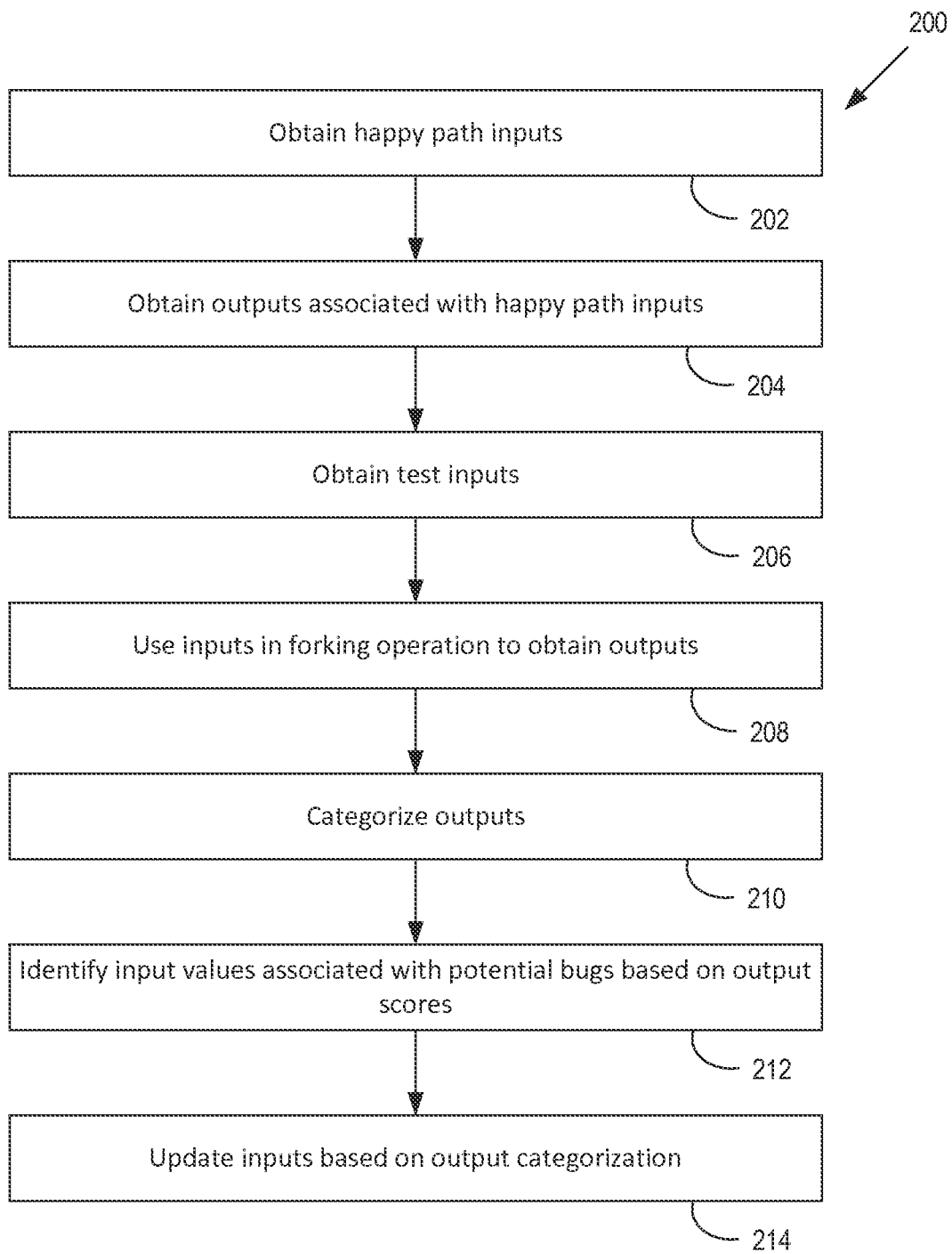
FIG. 2 is a flow diagram of method steps for automatic analysis for bug detection, according to an example.

FIG. 2 is a flow diagram of method steps for automatic analysis for bug detection, according to an example. Although the method steps are described with respect to the system of FIG. 1, those of skill in the art will understand that any system that performs the described steps, in any technically feasible order, is within the scope of the present disclosure.

As shown, a method 200 begins at step 202, where VM fork analyzer 184 obtains happy path inputs. These happy path inputs may be included in input values 174, and may be a pre-defined set of values "known" (e.g., by a developer) to result in execution of test application 172 in a manner that is considered to be acceptable. At step 204, VM fork analyzer 184 obtains outputs associated with the happy path inputs by executing test application 172, and, at each fork point, applying the corresponding happy path input and recording the outputs resulting from that input. The outputs recorded may be any or all of the outputs described herein, including, without limitation, a screen capture, log file, stack trace, and/or any other output that is indicative of the state of test application 172 after the happy path input associated with the particular fork point has been applied.

At step 206, VM fork analyzer 184 obtains test input values, included within input values 174. As described elsewhere herein, these test inputs may be obtained in a variety of ways including direct input, crowdsourcing, or in other ways. At step 208, VM fork analyzer 184 obtains test outputs 176 by performing fork operations. Specifically, VM fork analyzer 184 executes test application 172. When a fork point is encountered, VM fork analyzer 184 obtains a test input that is associated with that fork point, forks the VM, storing state for an "original" copy of the VM and executes a new copy of the VM for which the test inputs are to be applied. Subsequently, VM fork analyzer 184 applies the test input to the new copy of the VM, recording the output that results. For any particular fork point, a particular test input may include multiple inputs to be applied in sequence at multiple fork points. In other words, any input value may in actuality be a sequence of input values to be applied consecutively at multiple consecutive fork points.

After an input value (or sequence) is applied, VM fork analyzer 184 releases the currently forked VM, for which the input value was applied, and again forks the "original" VM associated with the happy path to generate a new forked VM. VM fork analyzer 184 applies a subsequent input value to this new forked VM in a similar manner as with the previous input value. After all inputs at a particular fork point have been input, VM fork analyzer 184 applies the happy path input for that fork point to arrive at a subsequent fork point. VM fork analyzer 184 again forks the VM, storing an "original" VM and a newly forked VM and applies test inputs for this subsequent fork point as with the previous fork point. VM fork analyzer 184 traverses through all fork points for all inputs in input values 174, storing outputs as specified. As part of recording the outputs associated with the input values, VM fork analyzer 184 also stores output differentials as described above.

At step 210, output analyzer 186 categorizes the output differentials obtained by VM fork analyzer 184. In general, categorizing results in a designation of a particular output as being a bug or not a bug as well as groupings of the different outputs. One example technique for the grouping portion of the four factor analysis is described below with respect to FIG. 4. At step 212, output analyzer 186 identifies input values that are associated with potential bugs based on the above-described output classification. Specifically, for each output designated as being associated with a bug, the corresponding input is also designated as being associated with a bug and for each output designated as being associated with no bug, the corresponding input is also designated as being associated with no bug.

At step 214, input classifier 188 updates inputs based on the output categorization performed by output analyzer 186. Specifically, input classifier 188 groups inputs into groups based on the output groups. For all output groups identified by output analyzer 186, input classifier 188 includes corresponding inputs in appropriate groups. For example, first, second, and third outputs are classified into a first group and fourth and fifth outputs are classified into a second group, then input classifier 188 groups first, second, and third inputs, which correspond to first, second, and third outputs, respectively, in a first input group and groups fourth and fifth inputs, which correspond to fourth and fifth outputs, respectively, into a second group. The purpose of this grouping is to reduce the number of inputs to be applied when performing automated bug analysis a subsequent time.

Note that VMs may be forked and executed in parallel. In other words, it is not necessary to wait for a particular forked VM to finish executing before forking a different VM for execution. Note also that there may be multiple happy paths. The VM forking and collection of outputs would occur for each such happy path. Inputs for testing may be associated with only one happy path, with more than one happy path, or with all happy paths, so that different inputs may be used as tests for any particular chosen set of happy paths. Note also that for each particular happy path, the analysis for determining difference of output would be done with reference to the happy path used to generate the output. K-means clustering analysis, described below, may also be performed once per happy path, and may also be optionally performed once per each state within the same happy path.

Figure 3A:
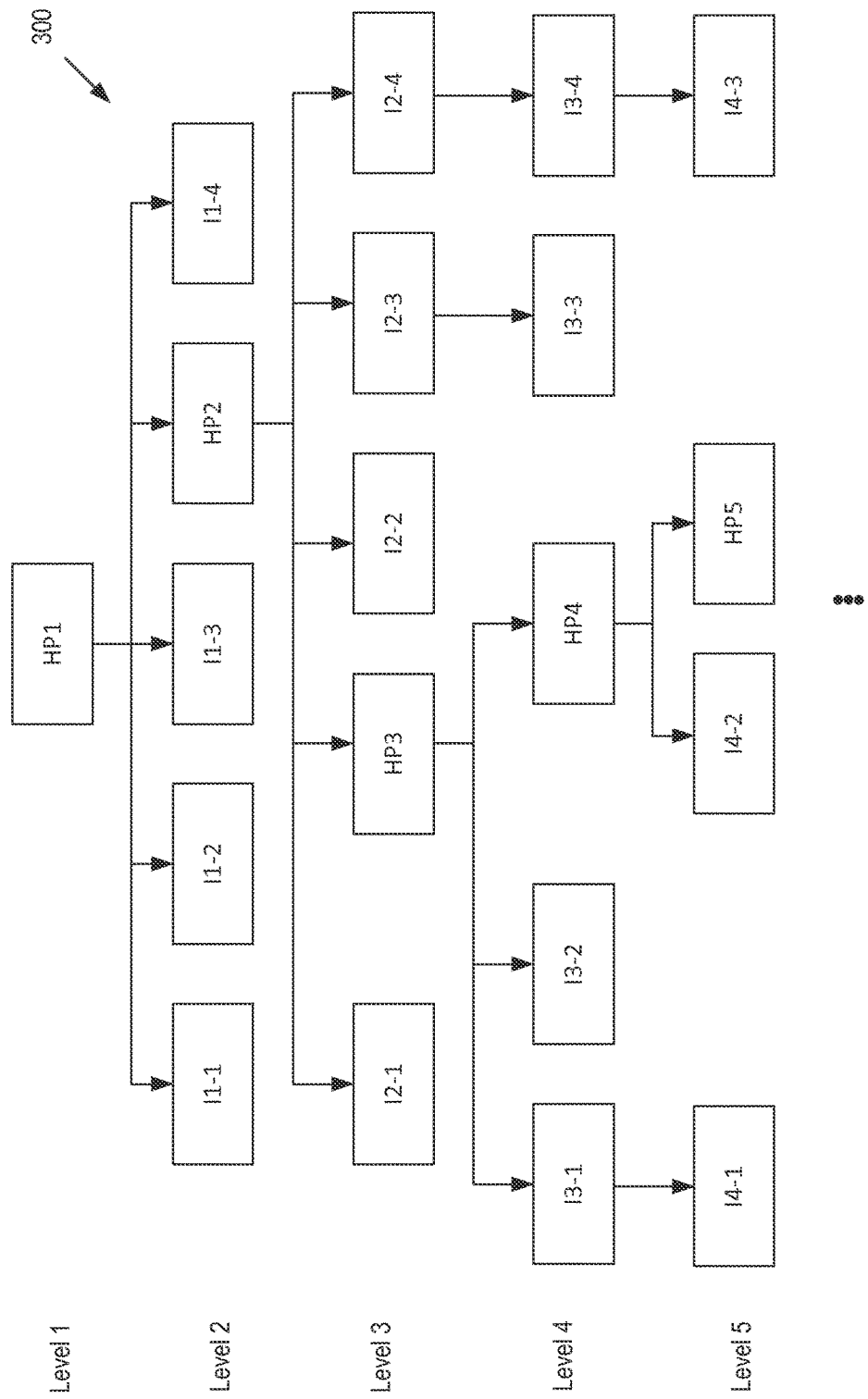
FIG. 3A is a program flow diagram that illustrates a set of inputs applied to a test application for a VM forking technique, according to an example.

FIG. 3A is a program flow diagram 300 that illustrates a set of inputs applied to a test application for a VM forking technique (step 208 in FIG. 2), according to an example. The program flow diagram 300 includes a number of input value boxes arranged into levels (e.g., levels 1-5). Each input value box represents a different input value applied to test application 172. Each level represents a different fork point. Note that program execution prior to the first fork point shown (i.e., level 1) is not illustrated in FIG. 3A and that program execution after the last fork point shown (level 5) is also not illustrated.

As described above, software bug analyzer 170 executes test application 172 until arriving at the fork point associated with level 1. At this fork point, software bug analyzer 170 applies a happy path input (HP1) and forks the VM to obtain a test VM. Note that HP1 may represent any number of actual input values (e.g., in sequence and/or at the same application state) applied to test application that are needed to bring test application to the fork point associated with level 1. After forking, software bug analyzer 170 applies a first input (I1-1) and records the resulting output. Software bug analyzer 170 "rolls back" the VM (i.e., releases the forked VM and focuses back on the original VM) and again forks the VM in order to apply a second input (I1-2). Software bug analyzer 170 forks and rolls back VM in this manner until all test inputs for level 2 have been applied. At this point, software bug analyzer 170 applies the happy path input for level 2 ("HP2") in order to advance test application 172 to level 3. At level 3, software bug analyzer 170 applies inputs at level 3 in a similar manner as with level 2 and subsequently applies the happy path input HP3 to advance to level 4.

Note that two inputs at level 3 are input sequences in that they consist of sequences applied at multiple levels. For example, input I2-3 is a sequence that also includes input I3-3 and input I2-4 is a sequence that also includes input I3-4 and I4-3. These input sequences represent sequences of inputs to be applied consecutively without inputting intervening happy path inputs. In other words, when encountering an input sequence, software bug analyzer 170 inputs the first input of that sequence, then the second input of that sequence, and so on, until the end of the sequence, without rolling back the VM. One example of an input sequence is a first input applied at a first page of a wizard followed by a second input applied at a second page of the wizard. The purpose of including input sequences is to allow for checking of bugs resulting from a sequence of inputs that deviates from the happy path at more than just a single fork point.

After all inputs, including input sequences, have been applied for level 3, software bug analyzer 170 applies the happy path input for level 3 ("HP3") and advances to the next fork point—level 4. At level 4, software bug analyzer 170 forks the VM, applies the inputs to the forked VM (for each input releasing and re-forking the VM as described above), and, when finished, applies happy path input HP4 to arrive at level 5. Note that at level four, inputs I3-3 and I3-4 do not get applied since they are part of an input sequence from a previous level. At level 5, software bug analyzer 170 applies the inputs at that level, with forking as described.

While the inputs shown in FIG. 3A are being applied, software bug analyzer 170 records the outputs associated with those inputs as described above. Software bug analyzer 170 also determines a differential between the recorded outputs and the outputs associated with the happy path, as described above, groups outputs together based on similarity, and groups inputs together based on the groups of the associated outputs. With the inputs grouped together, a subsequent test of test application 172 can use fewer of the inputs already tested.

FIG. 3B is a program flow diagram 350 that illustrates a subsequent test of test application 172 using fewer inputs due to certain inputs being deemed to be similar, according to an example. Specifically, software bug analyzer 170 has analyzed outputs associated with the inputs of FIG. 3A and grouped those outputs based on "similarity." Specifically, software bug analyzer 170 has determined that outputs associated with I1-1, I1-2, I1-3, I1-4 are similar, outputs associated with I2-1 and I2-2 are similar, and outputs associated with I4-2 and I4-3 are similar. In performing the subsequent test illustrated in FIG. 3B, then, software bug analyzer 170 does not provide inputs I1-2, I1-3, or I1-4, thus reducing the amount of time required for the test and/or allowing other inputs to be tested. Program flow diagram 350 shows several nodes collapsed based on the reduction in test inputs applied, as discussed above.

Figure 4:
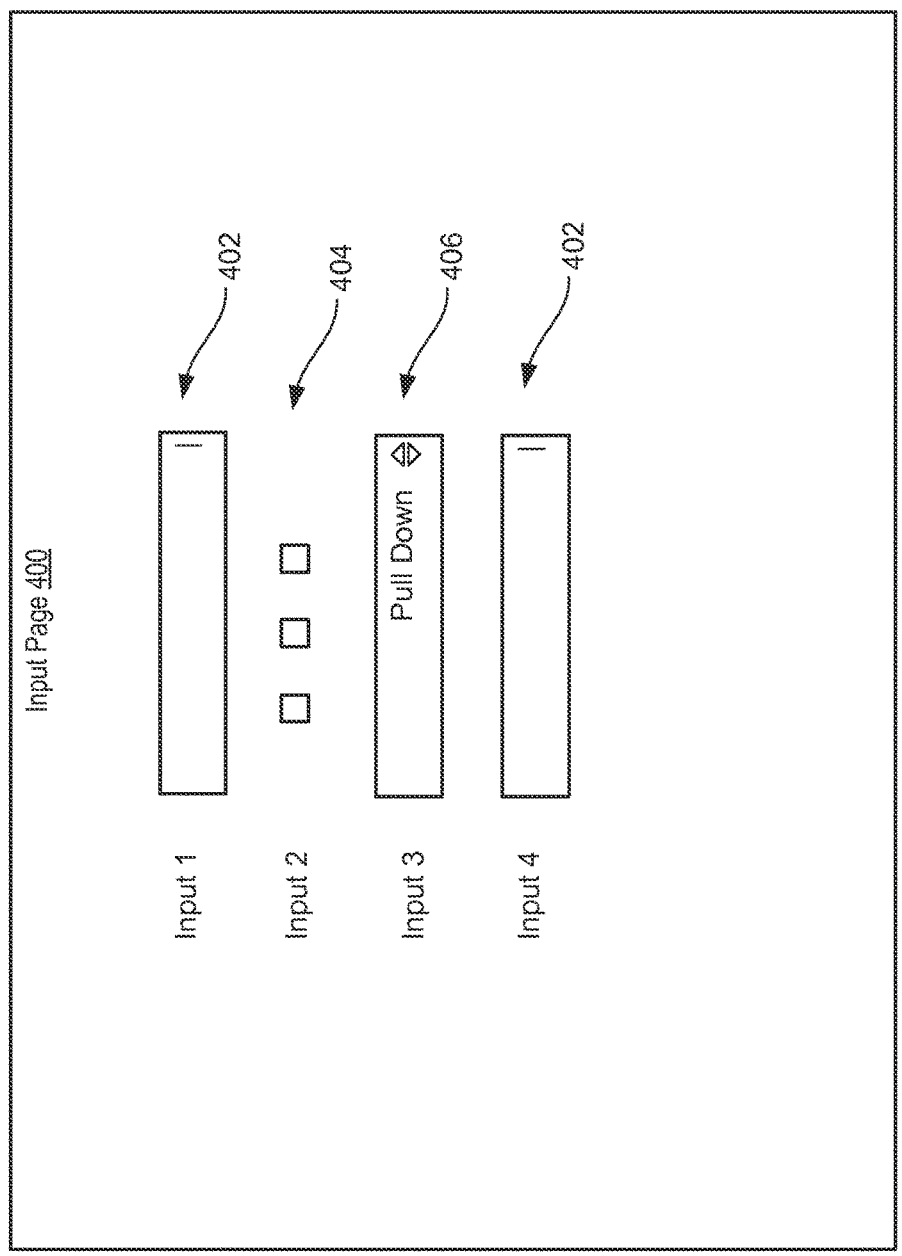
FIG. 4 is a diagram that illustrates an example input page associated with a particular fork point, according to an example.

FIG. 4 is a diagram that illustrates an example input page 400 associated with a particular fork point, according to an example. As shown, the input page includes different input elements, including a text box 402, checkboxes 404, a pull down menu 306, and another text box 408. Input page 400 represents a particular fork point in a particular example of a test application. Note that the input page 400 is an example of a particular fork point in a program but that any point in a program may be a fork point.

The inputs illustrated in FIG. 4 correspond to elements for which different input values can be provided when software bug analyzer 170 is applying different inputs at a particular fork point. These elements include text boxes 402, check boxes 404, and a pull down menu 406. The happy path is associated with a particular set of pre-chosen input values to apply to those inputs. When applying test inputs at a particular fork point, software bug analyzer 170 may hold input values for all but one (or any number) input element constant at a particular value (e.g., a value corresponding to the happy path inputs) and apply the test input to the remaining input element(s). It should be understood that while particular types of inputs are shown at a particular fork point in an example application, the techniques described herein can be used for various types of applications with differing types of inputs and with fork points associated with application state other than an input form as shown in FIG. 4.

Figure 5:
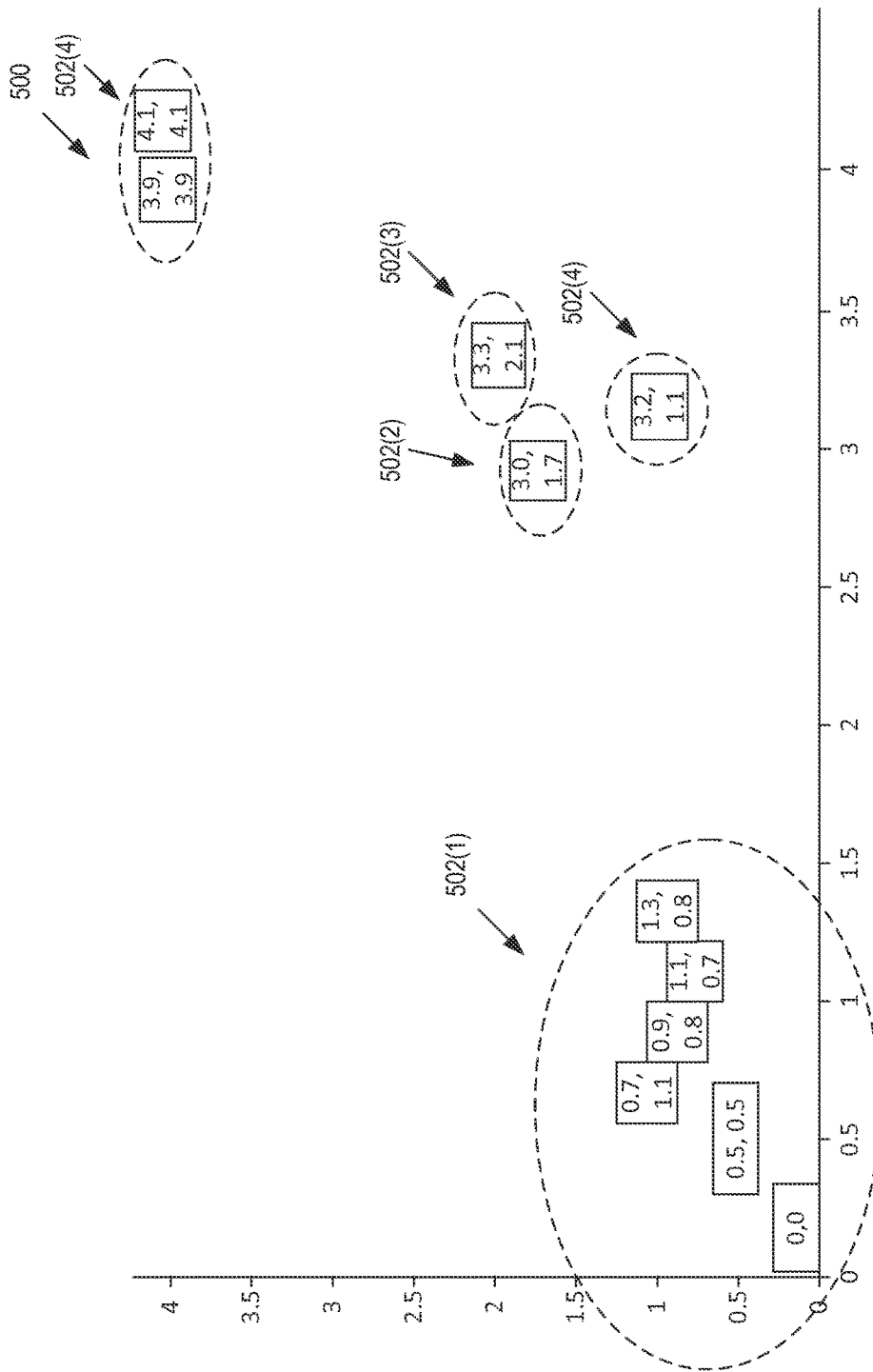
FIG. 5 illustrates a graph illustrating a technique for grouping outputs obtained by VM fork analyzer, according to an example.

FIG. 5 illustrates a graph 500 illustrating a technique for grouping outputs obtained by VM fork analyzer 184, according to an example. As described above, when a particular set of inputs is applied, software bug analyzer 170 captures output from test application 172. Software bug analyzer 170 (e.g., via output analyzer 186) may perform output analysis on the output to group outputs together. One example of output analysis is now provided.

The output analysis includes performing k-means clustering on output differentials, such as those described above. For the particular example illustrated in FIG. 5, the output differentials used include a log file size differential between the log file output generated based on a particular set of inputs and the log file output generated based on the happy path inputs as described above, a Hamming distance between a perceptual hash for the graphical output associated with the particular set of inputs and a perceptual hash for the graphical output associated with the happy path inputs, a differential in the number of keywords found in an output log file, and a constant indicative of whether a core dump occurred. The Hamming distance is added to the log file size differential to obtain a first output difference value, which is represented by the x-axis. A second output difference value is determined as the log file keyword differential added to the core dump value, represented on the y-axis. For each set of test inputs, a characteristic two dimensional output vector is formed from the first output difference value and the second output difference value (i.e., the vector includes two elements—the first output difference value and the second output difference value). It should be understood that although a particular combination of output types is described for the k-means cluster vectors, other combinations are possible as well. Each item illustrated in FIG. 5 is a 2-dimensional vector including the x-axis item and y-axis item described above.

Software bug analyzer 170 performs k-means clustering analysis for multiple output vectors at a particular fork point to obtain clusters 502 of output vectors. As is known, k-means clustering is an algorithm that groups vectors into clusters in a manner that minimizes the within-cluster sum of squares. The result of k-means clustering can be thought of as a way to obtain "closely grouped" clusters of vectors. In terms of checking for bugs, each cluster can be thought of as being a "qualitatively different" output result. Generally, one cluster—the one closest to the origin—would include output associated with the happy path and other outputs that do not include bugs and other clusters would include output that may be considered to be bugs (or may not be bugs).

In some embodiments, for purposes of bug identification, each cluster that does not include the happy path may be assumed to include a bug unless explicitly marked otherwise. Clusters may be marked as bugs in a variety of ways. In one way, a human trainer may manually mark a particular cluster as being associated with a bug. When later tests are performed (for example for an updated version of test application 172), output vectors that fall within a cluster that has an input that has already been marked as having a bug or not having a bug may automatically be assigned to have the same designation as the other output vectors in that cluster.

Note that the distance to the origin (in the k-means clustering graph) may be used to determine how likely it is that input associated with any particular cluster is associated with a bug. For example, if a particular cluster, having a particular distance to the origin, has already been determined to be associated with a bug, then another cluster, having a greater distance to the origin, would be assumed to be associated with a bug. The distance used may be from any element within the cluster, the closest element to the origin within the cluster, or any other value that is located with the boundaries of the cluster.

The clustering described with respect to FIG. 5 may also be used to group inputs associated with the output vectors together. Specifically, the inputs associated with the output vectors in each cluster may also be considered to be grouped together. Thus if first, second, and third output vectors are included within a first cluster and fourth and fifth output vectors are included within a second cluster, then the inputs associated with the first, second, and third output vectors may be considered to be included in a first group of inputs and the inputs associated with the fourth and fifth inputs may be considered to be included in a second group of inputs. One purpose of grouping inputs together like this is to reduce the number of inputs to be applied in subsequent rounds of testing, as described above with respect to FIG. 3B. It should be understood that although a particular technique for grouping outputs is illustrated (k-means clustering), other techniques may be used as well. Note that the k-means clustering that is described is 2-dimensional k-means clustering, but that clustering of any dimensionality may be used.

The clustering described with respect to FIG. 5 may be used as the third factor described above with respect to FIG. 1.

Note that after clusters and scores are obtained, an interface may be generated and provided to a human use for evaluation. The interface may include a report for each cluster, each input, or for each of other types of groupings of data. Each report may include a log differential, keywords (e.g., "ERROR," "FATAL," or the like) found within various outputs described above, a screenshot at some designated point in time, such as just before releasing the forked VM, a link to a location that includes relevant dumps (e.g., heap dump, core dump, and the like), as well as other information. The interface may be displayed in rows, each row including a different report. The generated reports may be stored at some location for future access.

Figure 6:
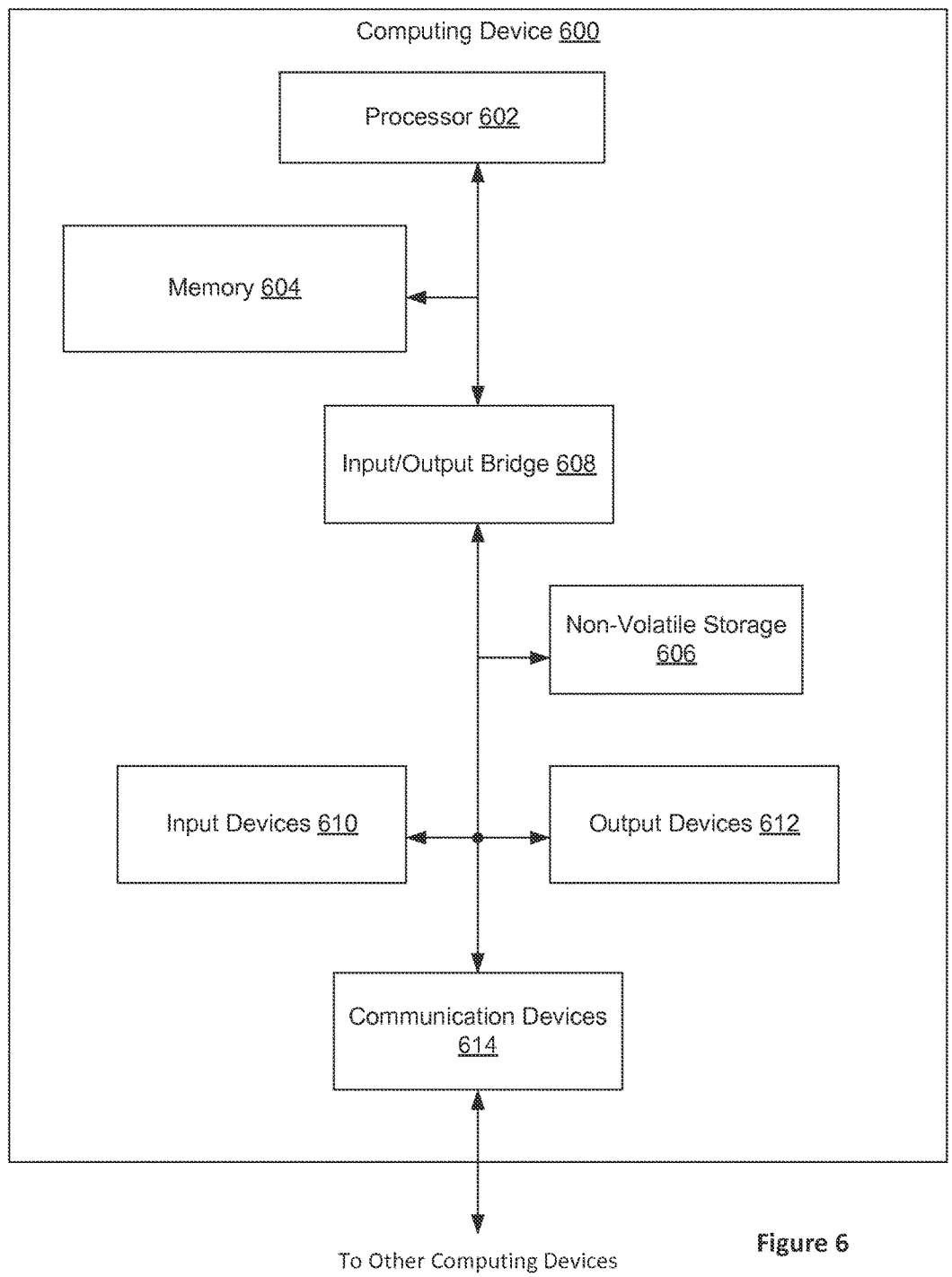
FIG. 6 is a block diagram of a computing device that may implement aspects described herein, according to an embodiment.

FIG. 6 is a block diagram of a computing device 600 that may implement aspects described herein, according to an embodiment. Computing device 600 includes processor 602, memory 604, non-volatile storage 606, input/output bridge 608, input devices 610, output devices 612, and communication devices 614. Processor 602 receives instructions and data and executes instructions to manipulate data as specified. Processor 602 may include one or more processors of a wide variety of processor types. Memory 604 stores instructions and data for manipulation by processor 602. Input/output bridge 608 allows processor 602 and memory 604 to communicate with other devices. Non-volatile storage 606 stores data and instructions in a non-volatile manner for recall by processor 602 and memory 604 on demand. Input devices 610 include devices that allow a user or other entity to input data into computing device 600. Input devices 610 may include devices such as keyboards, mice, and the like. Output devices 612 include devices that provide output information to a user or other entity and may include devices such as monitors, printers, and the like. Communication devices 614 include devices that facilitate communication by computing device 600 with other external computing devices. Communication devices 614 thus may include devices such as Ethernet devices, wireless communication devices, and the like.

Computing device 600 may implement any aspect of the disclosure described herein. For example, computing device 600 may implement software bug analyzer 170. Thus, software bug analyzer may be considered to be embodied as computing device 600 executing software to perform the above-described functionality. Computing device 600 may also implement any or all physical computers 150, virtual machine management server 140, service provider 182, and service consumers 180. Any particular embodiment of computing device 600 implementing any particular aspect described herein may differ from another embodiment of computing device 600 implementing a different aspect described herein. Multiple computing devices 600 may implement different aspects described herein. Further, any particular computing device 600 may implement more than one aspect described herein. In one example, a single computing device 600 both executes VMs 165 as well as software bug analyzer 170.

The above techniques provide for efficient, quick bug detection. Specifically, by using the VM forking feature, by automatically stepping through the various inputs and fork points, without human intervention, and by automatically classifying the outputs resulting from the various inputs, bugs may be quickly and efficiently identified.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for detecting bugs in an application, the method comprising:
   executing a test application in a first virtual machine;
   creating a snapshot associated with the first virtual machine and the test application at a fork point;
   executing the test application at the fork point of the test application in a second virtual machine generated using the snapshot at the fork point, wherein the fork point of the test application defines a point in the test application after at least one predetermined input is applied to the test application;
   applying a test input to the test application executed in the second virtual machine;
   responsive to applying the test input, recording a test output comprising a first output type and a second output type; and
   determining that the test input is associated with a bug based at least in part on a distance of an output vector that indicates that the test output is associated with a bug, the distance of the output vector being determined using a first output differential between the first output type of the test output and a corresponding first output type of a happy path output associated with a happy path input at the fork point and a second output differential between the second output type of the test output and a corresponding second output type of the happy path output, wherein the happy path input is an input value that provides a desired or error-free execution of the test application.

2. The method of claim 1, further comprising:
   applying the happy path input to the test application executed in the first virtual machine at the fork point; and
   responsive to applying the happy path input, recording the happy path output.

3. The method of claim 1, further comprising:
   executing the test application in a third virtual machine generated using the snapshot at the fork point;
   applying a second test input to the test application executed in the third virtual machine; and
   responsive to applying the second test input, recording a second test output, wherein the test output is a first test output.

4. The method of claim 3, further comprising:
   analyzing the first test output and the second test output to determine that both the first test output and the second test output belong in an output group.

5. The method of claim 4, wherein:
   analyzing the first test output and the second test output comprises performing k-means clustering analysis and determining that both the first test output and the second test output belong in the output group.

6. The method of claim 1, wherein:
   both the test output and the happy path output include graphical data; and
   determining the first output differential comprises obtaining a first Hamming distance between a first perceptual hash associated with the test output and a second Hamming distance between a second perceptual hash associated with the happy path output.

7. The method of claim 1, wherein:
   both the test output and the happy path output include log file data; and
   determining the first output differential comprises obtaining a log file differential size difference between a first log file associated with the test output and a second log file associated with the happy path output.

8. The method of claim 1, wherein:
   both the test output and the happy path output include stack trace data; and
   determining the first output differential comprises determining a stack trace differential.

9. The method of claim 1, wherein:
   both the test output and the happy path output include keyword count data; and
   determining the first output differential comprises determining a keyword count.

10. A system for detecting bugs in an application, the system comprising:
    at least one computing device; and
    a memory storing instructions that, when executed by the at least one computing device, causes the at least one computing device to:
    execute a test application in a first virtual machine;
    create a snapshot associated with the first virtual machine and the test application at a fork point;
    execute the test application at the fork point of the test application in a second virtual machine generated using the snapshot at the fork point, wherein the fork point of the test application defines a point in the test application after at least one predetermined input is applied to the test application;
    apply a test input to the test application executed in the second virtual machine;
    responsive to applying the test input, record a test output comprising a first output type and a second output type; and
    determine that the test input is associated with a bug based at least in part on a distance of an output vector that indicates that the test output is associated with a bug, the distance of the output vector being determined using a first output differential between the first output type of the test output and a corresponding first output type of a happy path output associated with a happy path input at the fork point and a second output differential between the second output type of the test output and a corresponding second output type of the happy path output, wherein the happy path input is an input value that provides a desired or error-free execution of the test application.

11. The system of claim 10, wherein when executed the instructions further cause the at least one computing device to:
    apply the happy path input to the test application executed in the first virtual machine at the fork point; and
    responsive to applying the happy path input, record the happy path output.

12. The system of claim 10, wherein when executed the instructions further cause the at least one computing device to:
    executing the test application in a third virtual machine generated using the snapshot at the fork point;

apply a second test input to the test application executed in the third virtual machine, wherein the test input is a first test input; and responsive to applying the second test input, record a second test output, wherein the test output is a first test output.

13. The system of claim 12, wherein when executed the instructions further cause the at least one computing device to analyze the first test output and the second test output to determine that both the first test output and the second test output belong in an output group.

14. The system of claim 13, wherein when executed the instructions further cause the at least one computing device to analyze the first test output and the second test output comprises performing k-means clustering analysis and determining that both the first test output and the second test output belong in the output group.

15. The system of claim 10, wherein:
both the test output and the happy path output include graphical data; and
the instructions further cause the at least one computing device to determine the first output differential by obtaining a first Hamming distance between a first perceptual hash associated with the test output and a second Hamming distance between a second perceptual hash associated with happy path output.

16. The system of claim 10, wherein:
both the test output and the happy path output include log file data; and
the instructions further cause the at least one computing device to determine the first output differential by obtaining a log file differential size difference between a first log file associated with the test output and a second log file associated with the happy path output.

17. The system of claim 10, wherein:
both the test output and the happy path output include stack trace data; and
the instructions further cause the at least one computing device to determine the first output differential using a stack trace differential.

18. The system of claim 10, wherein:
both the test output and the happy path output include keyword count data; and
the instructions further cause the at least one computing device to determine the first output differential using a keyword count.

19. The system of claim 10, wherein the first virtual machine and the second virtual machine are executed in a same computing device of the at least one computing device.

20. A non-transitory computer-readable medium storing instructions that, when executed by a processor, cause the processor to:
execute a test application in a first virtual machine;
create a snapshot associated with the first virtual machine and the test application at a fork point;
execute the test application at the fork point of the test application in a second virtual machine generated using the snapshot at the fork point, wherein the fork point of the test application defines a point in the test application after at least one predetermined input is applied to the test application;
apply a test input to the test application executed in the second virtual machine;
responsive to applying the test input, record a test output comprising a first output type and a second output type; and
determine that the test input is associated with a bug based at least in part on a distance of an output vector that indicates that the test output is associated with a bug, the distance of the output vector being determined using a first output differential between the first output type of the test output and a corresponding first output type of a happy path output associated with a happy path input at the fork point and a second output differential between the second output type of the test output and a corresponding second output type of the happy path output, wherein the happy path input is an input value that provides a desired or error-free execution of the test application.

* * * * *